(12) United States Patent
Pawlas et al.

(10) Patent No.: US 7,005,019 B2
(45) Date of Patent: Feb. 28, 2006

(54) MANUFACTURING FLOW METERS HAVING A FLOW TUBE MADE OF A FLUOROPOLYMER SUBSTANCE

(75) Inventors: Gary Edward Pawlas, Louisville, CO (US); Mark James Bell, Arvada, CO (US); Matthew Glen Wheeler, Arvada, CO (US); Daniel Patrick McNulty, Westminster, CO (US); Jonathan Steven Ash, Denver, CO (US); Leland Charles Leber, Fort Collins, CO (US)

(73) Assignee: Emerson Electric Co., St. Louis, MO (US)

( * ) Notice: Subject to any disclaimer, the term of this patent is extended or adjusted under 35 U.S.C. 154(b) by 162 days.

(21) Appl. No.: 09/994,264

(22) Filed: Nov. 26, 2001

(65) Prior Publication Data

US 2003/0097883 A1   May 29, 2003

(51) Int. Cl.
*B29C 65/54*   (2006.01)
(52) U.S. Cl. .................. 156/64; 156/244.13; 156/293; 156/297; 156/305; 156/423
(58) Field of Classification Search ............. 156/153, 156/281, 293, 305, 423, 64, 244.13, 297; 216/34, 35; 264/261; 403/268; 73/861.354, 73/861.355, 861.357
See application file for complete search history.

(56) References Cited

U.S. PATENT DOCUMENTS

| | | | | |
|---|---|---|---|---|
| 3,352,960 | A | * | 11/1967 | McLaughlin ................ 264/322 |
| 4,244,768 | A | * | 1/1981 | Wiechowski et al. ....... 156/305 |
| 4,561,954 | A | * | 12/1985 | Scrantom et al. .......... 29/25.42 |
| 4,628,744 | A | | 12/1986 | Lew |
| 5,027,662 | A | | 7/1991 | Titlow et al. |
| 5,035,940 | A | | 7/1991 | Winton et al. |
| 5,157,975 | A | | 10/1992 | Tanaka et al. |
| 5,261,284 | A | * | 11/1993 | Hopkinson ............. 73/861.355 |
| 5,307,689 | A | * | 5/1994 | Nishiyama et al. ..... 73/861.357 |
| 5,403,533 | A | | 4/1995 | Meier |

(Continued)

FOREIGN PATENT DOCUMENTS

EP     997709     * 5/2000

(Continued)

OTHER PUBLICATIONS

Landrock, Adhesives Technology Handbook, 1985, pp. 54-60, 74-76, 87-89, 126-128, 134-135, 141-149, 211-213.*

(Continued)

*Primary Examiner*—Steven D. Maki
(74) *Attorney, Agent, or Firm*—Setter, Ollila LLC

(57) ABSTRACT

A flow meter is disclosed that is comprised of a base, a driver, pick-offs, and a flow tube made from a fluoropolymer substance. The base of the flow meter is comprised of a first leg and a second leg. The first leg includes a tube opening and an adhesive opening and the second leg includes a tube opening and an adhesive opening. The flow tube passes through the tube openings of the first leg and the second leg. The tube opening of the first leg has a diameter slightly larger than the flow tube to create a gap between the tube opening and the flow tube. The adhesive opening of the first leg provides access to the gap so that adhesive may be applied to the flow tube and an inner surface of the tube opening to affix the flow tube to the base. The adhesive opening in the second leg performs the same function.

17 Claims, 9 Drawing Sheets

U.S. PATENT DOCUMENTS

| | | | |
|---|---|---|---|
| 5,448,921 A | | 9/1995 | Cage et al. |
| 5,449,207 A | * | 9/1995 | Hockett ............... 156/305 |
| 5,753,827 A | * | 5/1998 | Cage ............... 73/861.357 |
| 5,814,739 A | | 9/1998 | Van Cleve |
| 5,837,090 A | * | 11/1998 | Binnie et al. ............ 156/305 |
| 5,842,496 A | * | 12/1998 | Delanty et al. ............ 156/305 |
| 5,918,285 A | | 6/1999 | Van der Pol |
| 6,336,370 B1 | * | 1/2002 | van der Pol ........... 73/861.357 |
| 6,439,060 B1 | * | 8/2002 | Cage ............... 73/861.357 |
| 2003/0097881 A1 | | 5/2003 | Schlosser et al. |
| 2003/0097882 A1 | | 5/2003 | Schlosser et al. |

FOREIGN PATENT DOCUMENTS

| | | | |
|---|---|---|---|
| JP | 54-110872 | * | 8/1979 |
| JP | 60-112877 | * | 6/1985 |
| JP | 5-26709 | * | 2/1993 |
| WO | WO 95/06562 | * | 3/1995 |
| WO | WO 01/65213 | * | 9/2001 |

OTHER PUBLICATIONS

D. J. Ewins, Modal Testing: Theory and Practice, Research Studies Press LTD., 1984, p. 199-206, Research Studies Press LTD., Somerset, England.

* cited by examiner

MANUFACTURING FLOW METERS HAVING A FLOW TUBE MADE OF A FLUOROPOLYMER SUBSTANCE

FIELD OF THE INVENTION

This invention relates to flow meters, and in particular, to manufacturing flow meters comprised of flow tubes made of a fluoropolymer substance.

PROBLEM

It is known to use Coriolis effect mass flow meters to measure mass flow and other information pertaining to materials flowing through a pipeline as disclosed in U.S. Pat. Nos. 4,491,025 issued to J. E. Smith, et al. of Jan. 1, 1985 and Re. 31,450 to J. E. Smith of Feb. 11, 1982. Flow meters have one or more flow tubes of a straight, curved or irregular configuration. Each flow tube has a set of natural vibration modes, which may be of a simple bending, torsional, or twisting type. Each material filled flow tube is driven to oscillate at resonance in one of these natural modes. The natural vibration modes are defined in part by the combined mass of the flow tubes and the material within the flow tubes. If desired, a flow meter need not be driven at a natural mode.

Material flows into the flow meter from a connected material source on the inlet side. The material is directed through the flow tube or flow tubes and is delivered to a material receiver connected to the outlet side.

A driver applies force to oscillate the flow tube. When there is no material flow, all points along a flow tube oscillate with an identical phase. As the material begins to flow, Coriolis accelerations cause each point on the flow tube to have a different phase with respect to other points on the flow tube. The phase on the inlet side of the flow tube lags the driver; the phase on the outlet side leads the driver. Pick-offs are placed on the flow tube to produce sinusoidal signals representative of the motion of the flow tube. The phase difference between the two pick-offs signals is proportional to the mass flow rate of the material flow.

It is known to use flow meters having different flow tube configurations. Among these configurations are single tube, dual tube, straight tube, curved tube, and flow tubes of irregular configuration. Most of the flow meters are made of metal such as aluminum, steel, stainless steel and titanium. Glass flow tubes are also known.

Positive attributes of Titanium in these types of flow meters are its high strength and low coefficient of thermal expansion (CTE). A negative attribute of Titanium is its cost of manufacturing. A Titanium flow meter is difficult and expensive to produce.

The prior art also suggests plastic flow tubes and plastic flow meters. This includes prior art where the entire flow meter is plastic or only the flow tube is formed of plastic. Much of this prior art merely contains an assertion that a flow meter may be made of various materials such as steel, stainless steel, titanium or plastic.

This prior art is not extensive so far as concerns the disclosure of a plastic Coriolis flow meter that can accurately output information over a range in operating conditions including temperature. This prior art is not extensive so far as concerns the disclosure of manufacturing a Coriolis flow meter that has a plastic flow tube.

The mere substitution of a plastic flow tube for a metal flow tube will produce a structure that looks like a flow meter. However, the structure will not function as a flow meter to generate accurate output information over a useful range of operating conditions. The mere assertion that a flow meter could be made out of plastic teaches nothing beyond the abstraction that plastic can be substituted for metal in a Coriolis flow meter. It does not teach how a plastic flow meter can be manufactured to generate accurate information over a useful range of operating conditions.

Perfluoroalkoxyethlene (PFA) is one type of plastic mentioned for use in a flow meter. U.S. Pat. No. 5,918,285 to Vanderpol discloses use of PFA for a flow tube. This suggestion regarding the use of PFA is incidental and the patent discloses no information regarding how a flow meter having a PFA flow tube could be manufactured to generate accurate flow information.

U.S. Pat. No. 5,403,533 to Dieter Meier discloses a flow tube lined with PFA. Unfortunately, the flow tube material and the PFA liner have different thermal properties. This causes the PFA liner to disengage from the flow tube creating leaks and performance problems. The manufacturing process for lining the metal flow tubes with PFA is also extremely costly.

PFA is very chemically inert and has very low surface energy. This makes PFA very difficult to bond to other objects using common adhesives. One way to solve this problem is to change the surface chemistry of PFA by chemical etching. Etching the surface of PFA provides for much stronger bonds using adhesives.

However, even though etching provides a stronger bond with PFA, bonding PFA to other objects must be carefully done to create a strong bond. The following considerations should be taken into account to create a strong bond: the type of adhesive used, the gap between the PFA and another object, whether there is complete coverage of the gap with the adhesive, whether the adhesive cures properly, the condition of the surface of the PFA, and the condition of the surface of the other object. Unfortunately, there is currently no convenient way to bond PFA to other objects to build a flow meter.

Typical Coriolis flow meters as described above are manufactured out of metal. Metal is fairly easy to manufacture with using current machining and welding technologies. A Coriolis flow meter is comprised of one or more metal flow tubes. Most Coriolis flow meters require that the ends of a flow tube be secured to achieve the desired dynamic characteristics of a vibrating tube. The flow tube is generally held in a fixed position at its ends by manifolds, brace bars, or some other structure. The flow tube is affixed to a manifold by welding the flow tube to the manifold. A driver and pick-offs are also affixed to the flow tube. One example of the driver and the pick-offs are a magnet-coil configuration. The driver and pick-offs are affixed to the flow tube by joining the magnets for the driver and the pick-offs to the flow tube. The driver and pick-offs can be easily and accurately affixed to the flow tube using current welding technologies.

Unfortunately, there is no easy way to affix a PFA flow tube to a manifold, brace bars, and the like to support the flow tube. There is also no easy and accurate way to affix a driver and pick-offs to a PFA flow tube. Traditional welding and brazing processes cannot be used for PFA flow tubes. Also, PFA is soft and flexible unlike metal. This can make working with PFA a difficult task compared to metal. To accurately measure mass flow rate of a process material, the driver and pick-offs should be accurately aligned and positioned on the flow tube. The difficulty of affixing the driver and pick-offs to a PFA flow tube makes accurate alignment and positioning of the driver and pick-offs very hard.

Manufacturers of PFA tubing generally produce the tubing in bulk. The manufacturer uses an extruder to produce the tubing. The tubing comes out of the extruder at a temperature higher than room temperature. The tubing is wound around a spool so that a large length of tubing can be easily handled and neatly packaged. The tubing cools on the spool. When the tubing is later unwound from the spool, the tubing typically has a curved shape. If the curved tube is used as a flow tube for a flow meter, the curved shape of the flow tube can cause accuracy problems for the flow meter. Therefore, a flow meter manufacturer must straighten the flow tube, hold the flow tube in a straight position during manufacturing, or acquire specially made tubing from the manufacturer at a high cost. Unfortunately, there is currently no convenient solution to the above problems that the flow meter manufacturer faces.

SOLUTION

The above and other problems are solved and an advance in the art is achieved by the present invention which discloses an improved flow meter using a flow tube made of a fluoropolymer substance, a fixture apparatus for manufacturing a flow meter having a flow tube made of fluoropolymer substance, a method for manufacturing straight flow tubes made of a fluoropolymer substance, and a method of testing the alignment of a driver and a pick-off on a flow tube.

The improved flow meter advantageously has adhesive openings machined into the base of the flow meter in which to inject an adhesive to bond the flow tube to the base. The adhesive openings allow for better coverage of a joint between the flow tube and the base, which produces a stronger bond. The adhesive openings also make manufacturing the flow meter an easier process.

The fixture apparatus advantageously secures the flow tube on a fixed axis during manufacturing. Having the flow tube secured by the fixture apparatus allows the flow meter manufacturer to more easily affix the flow tube to the base of the flow meter. The fixture apparatus also eases the task of adhering drivers and pick-offs to the flow tube. The fixture apparatus also helps to correctly align the driver and pick-offs on the flow tube. The fixture apparatus also serves to straighten the flow tube and minimize or eliminate curvature in the active or vibrating portion of the flow tube.

The method of testing the alignment of a driver and a pick-off on a flow tube advantageously provides the flow meter manufacturer with a quality control check. The flow meter manufacturer can easily and conveniently determine how accurate the manufacturing process is. The flow meter manufacturer can also identify problems with the manufacturing process and determine what adjustments need to be made.

The method for manufacturing straight flow tubes made of a fluoropolymer substance advantageously helps the flow tube manufacturer produce a more accurate flow meter. When a straight flow tube is desired, the flow meter manufacturer can easily and conveniently receive straight flow tubes directly from the flow tube manufacturer by working with the supplier and defining a straightness requirement on the flow tube specification. The flow meter manufacturer does not need to straighten the flow tubes before manufacturing the flow meters. The flow meter manufacturer is not faced with the challenge of building a flow meter with a partially curved flow tube.

One embodiment of the improved flow meter is a flow meter comprised of a base, a flow tube, a driver, and pick-offs. The driver and pick-offs are affixed to the flow tube. The base of the flow meter is comprised of a first leg and a second leg. The first leg includes a tube opening and an adhesive opening and the second leg includes a tube opening and an adhesive opening. The flow tube passes through the tube opening of the first leg and through the tube opening of the second leg. The tube opening and adhesive opening on the first leg intersect in the first leg and are on a similar plane so that the tube opening and adhesive opening of the first leg can be positioned horizontally at the same time. The tube opening and adhesive opening on the second leg intersect in the second leg and are on a similar plane so that the tube opening and adhesive opening of the second leg can be positioned horizontally at the same time.

The tube opening of the first leg has a diameter slightly larger than the flow tube to create a gap between tube opening of the first leg and the flow tube. The adhesive opening of the first leg provides access to the gap so that adhesive may be applied to the flow tube and an inner surface of the tube opening of the first leg. The tube opening of the second leg has a diameter slightly larger than the flow tube to create a gap between tube opening of the second leg and the flow tube. The adhesive opening of the second leg provides access to the gap so that adhesive may be applied to the flow tube and an inner surface of the tube opening of the second leg.

The following illustrates a method that a manufacturer may use to build the flow meter described above. First, the manufacturer orientates the tube opening of the first leg, the adhesive opening of the first leg, and the flow tube on a horizontal plane. The manufacturer positions a tip of an adhesive applicator in the adhesive opening of the first leg to access the gap proximate an outer surface of the flow tube and the inner surface of the tube opening of the first leg. The manufacturer introduces an amount of adhesive in the gap. Due to the surface energies of the outer surface of the flow tube and the inner surface of the tube opening of the first leg, the adhesive is drawn into the gap due to capillary action or wicking. When the adhesive reaches the ends of the tube opening, the wicking stops and forms a uniform and symmetric fillet. The manufacturer then allows the adhesive to cure. The manufacturer performs the same operation to affix the flow tube to the tube opening of the second leg. The adhesive openings provide an easier and better way to bond the flow tube to the base of the flow meter.

One embodiment of the fixture apparatus comprises a first section and a second section. The fixture apparatus is configured to secure a flow tube of a flow meter during manufacturing of the flow meter. The first section includes a first tube opening portion on an end of the first section. The second section includes a second tube opening portion on an end of the second section. The end of the first section and the end of the second section are configured to fit adjacent one another.

When placed adjacently, the first section and the second section form a fixture block. The fixture block includes a tube opening formed from the first tube opening portion and the second tube opening portion. The tube opening is for holding the flow tube of the flow meter during manufacturing.

A securing means secures the first section and the second section to the base of the flow meter. The securing means aligns the tube opening of the fixture block with the tube openings of the base of the flow meter. That way, the flow tube can be secured to the base of the flow meter.

The fixture apparatus also includes an alignment means for affixing a driver component and a pick-off component to the flow tube.

One embodiment of the method of testing the alignment of a driver and a pick-off on a flow tube of a flow meter is as follows. To test the alignment, the manufacturer vibrates the flow tube at one or more drive frequencies using the driver. The manufacturer uses a processing system to receive pick-off signals from the pick-offs. The pick-off signals represent a vibrating frequency of the flow tube. The processing system processes the pick-off signals and signals representing the drive frequencies to determine a frequency response. The processing system identifies unacceptable alignment of the driver and the pick-offs on the flow tube based on the frequency response.

One embodiment of the method for manufacturing flow tubes made from a fluoropolymer substance is provided below. The manufacturer extrudes a flow tube from an extruding system. The flow tube is made from a fluoropolymer substance, such as PFA. The flow tube comes out of the extruder at a temperature that is higher than room temperature. The manufacturer cuts a section of the flow tube. The manufacturer then secures the section of the flow tube to hold the longitudinal shape of the section straight as the section cools down. When the flow tube has cooled and is straight, the manufacturer packages the section of flow tube to maintain the straight shape of the section.

The invention includes one or more aspects that are provided below.

One aspect of the invention is a flow meter, comprising:
a base comprised of:
a first leg,
a tube opening extending through said first leg,
an adhesive opening extending from a surface on said first leg and intersecting said tube opening of said first leg,
a second leg parallel to said first leg,
a tube opening extending through said second leg coaxial to said tube opening of said first leg, and
an adhesive opening extending from a surface on said second leg and intersecting said tube opening of said second leg;
a flow tube made from a fluoropolymer substance extending through said tube opening of said first leg and through said tube opening of said second leg;
a driver affixed to said flow tube for vibrating said flow tube; and
at least one pick-off affixed to said flow tube for detecting motion of said vibrating flow tube.

Preferably, the flow tube is made of perfluoroalkoxyethlene (PFA).

Preferably, the base is made of stainless steel.

Preferably, the flow meter comprises a Coriolis flow meter.

Another aspect is a method of affixing said flow tube to said first leg and said second leg of said flow meter, the method comprising:
orienting said tube opening of said first leg, said adhesive opening of said first leg, and said flow tube on a horizontal plane;
positioning a tip of an adhesive applicator in said adhesive opening of said first leg to access a gap between an outer surface of said flow tube and an inner surface of said tube opening of said first leg;
introducing an amount of adhesive in said gap between said outer surface of said flow tube and said inner surface of said tube opening of said first leg;
orienting said tube opening of said second leg, said adhesive opening of said second leg, and said flow tube on said horizontal plane;
positioning said tip of said adhesive applicator in said adhesive opening of said second leg to access a gap between said outer surface of said flow tube and an inner surface of said tube opening of said second leg; and
introducing said amount of adhesive in said gap between said outer surface of said flow tube and said inner surface of said tube opening of said second leg.

Preferably, said adhesive comprises a cyanoacrylate adhesive.

Preferably, the method further comprises selecting said adhesive based on a viscosity of said adhesive.

Preferably, the method further comprises controlling a relative humidity of an environment surrounding said flow meter to cure said adhesive.

Preferably, the method further comprises controlling a temperature of said flow meter to cure said adhesive.

Preferably, the method further comprises etching said outer surface of said flow tube prior to introducing said adhesive.

Preferably, the method further comprises etching said outer surface of said flow tube using a sodium naphthalene etchant.

Preferably, the method further comprises cleaning said outer surface of said flow tube prior to introducing said adhesive.

Preferably, the method further comprises roughening said inner surface of said tube opening of said first leg and said inner surface of said tube opening of said second leg prior to introducing said adhesive.

Preferably, the method further comprises cleaning said inner surface of said tube opening of said first leg and said inner surface of said tube opening of said second leg prior to introducing said adhesive.

Preferably, the method further comprises cleaning said inner surface of said tube opening of said first leg and said inner surface of said tube opening of said second leg by washing said inner surface of said tube opening of said first leg and said inner surface of said tube opening of said second leg with acetone in an ultrasonic bath.

Preferably, the method further comprises selecting a size of said gap between said outer surface of said flow tube and said inner surface of said tube opening of said first leg based on a viscosity of said adhesive, a surface energy of said outer surface of said flow tube, and a surface energy of said inner surface of said tube opening of said first leg.

Preferably, the method further comprises selecting said amount of said adhesive based on a speed of curing.

Preferably, the method further comprises applying an accelerator to said adhesive to accelerate curing of said adhesive.

Another aspect of the invention comprises a fixture apparatus for manufacturing a flow meter comprised of a base, a flow tube made from a fluoropolymer substance, a driver for vibrating said flow tube, and at least one pick-off for detecting movement of said vibrating flow tube, said base having a first leg and a second leg that are parallel to one another, said first leg having a tube opening extending through said first leg, said second leg having a tube opening coaxial to said tube opening of said first leg and extending through said second leg, said fixture apparatus comprising:
a first section having a first tube opening portion on an end of said first section; and
a second section having a second tube opening portion on an end of said second section, said end of said second section adapted to fit adjacent to said end of said first section to form a fixture block, said fixture block having tube opening formed from said first tube opening portion and said second tube opening portion, said fixture block adapted to fit between said first leg and said second leg of said base.

Preferably, said fixture block further comprises:

a driver opening extending from a first surface of said fixture block and intersecting said tube opening of said fixture block; and at least one pick-off opening extending from a second surface of said fixture block and intersecting said tube opening of said fixture block.

Preferably, a length of said fixture block is substantially similar to a distance between an inner surface of said first leg and an inner surface of said second leg.

Preferably, said base further includes a securing means adapted to secure said first section and said second section to said base of said flow meter to align said tube opening of said fixture block with said tube opening of said first leg and said tube opening of said second leg.

Preferably, said base further includes a driver opening that extends through said base and said securing means is further adapted to secure said fixture block to said base to align said driver opening of said base with said driver opening of said body, and at least one pick-off opening that extends through said base and said securing means is further adapted to secure said fixture block to said base to align said at least one pick-off opening of said base with said at least one pick-off opening of said fixture block.

Preferably, said fixture block is comprised of Delrin.

Alternatively, said fixture block is comprised of stainless steel.

Preferably, the fixture apparatus further comprises a fastening means adapted to attach said first section to said second section.

Preferably, the fixture apparatus further comprises an alignment means adapted to fit in said driver opening of said fixture block and extend from said first surface of said fixture block to an area adjacent said tube opening of said fixture block.

Preferably, said alignment means includes a lip on one end that is larger than a diameter of said driver opening of said fixture block, said lip adapted to allow said alignment means to extend into said driver opening a certain distance.

Another aspect of the invention comprises a method of using said fixture apparatus to affix said flow tube to said base of said flow meter, the method comprising:

inserting said flow tube through said tube opening of said first leg and said tube opening of said second leg;

aligning said first section and said second section of said fixture apparatus to enclose said flow tube between said first tube opening portion and said second tube opening portion;

fastening said first section to said second section to form said fixture block;

securing said fixture block to said base;

introducing an amount of adhesive in a gap between an outer surface of said flow tube and said inner surface of said tube opening of said first leg; and introducing said amount of adhesive in a gap between said outer surface of said flow tube and said inner surface of said tube opening of said second leg.

Preferably, said adhesive comprises a cyanoacrylate adhesive.

Preferably, said flow tube is made of perfluoroalkoxyethlene (PFA).

Preferably, said base is made of stainless steel.

Preferably, the method further comprises selecting said adhesive based on a viscosity of said adhesive.

Preferably, the method further comprises controlling a relative humidity of an environment surrounding said flow meter to cure said adhesive.

Preferably, the method further comprises controlling a temperature of said flow meter to cure said adhesive.

Preferably, the method further comprises etching said outer surface of said flow tube prior to introducing said adhesive.

Preferably, the method further comprises etching said outer surface of said flow tube using a sodium naphthalene etchant.

Preferably, the method further comprises cleaning said outer surface of said flow tube prior to introducing said adhesive.

Preferably, the method further comprises roughening said inner surface of said tube opening of said first leg and said inner surface of said tube opening of said second leg prior to introducing said adhesive.

Preferably, the method further comprises cleaning said inner surface of said tube opening of said first leg and said inner surface of said tube opening of said second leg prior to introducing said adhesive.

Preferably, cleaning said inner surface of said tube opening of said first leg and said inner surface of said tube opening of said second leg comprises washing said inner surface of said tube opening of said first leg and said inner surface of said tube opening of said second leg with acetone in an ultrasonic bath.

Preferably, the method further comprises selecting a size of said gap between said outer surface of said flow tube and said inner surface of said tube opening of said first leg based on a viscosity of said adhesive, a surface energy of said outer surface of said flow tube, and a surface energy of said inner surface of said tube opening of said first leg.

Preferably, the method further comprises selecting said amount of said adhesive based on a speed of curing.

Preferably, the method further comprises applying an accelerator to said adhesive to accelerate curing of said adhesive.

Another aspect of the invention comprises a method of using said fixture apparatus to affix a driver component of said driver to said flow tube of said flow meter, the method comprising:

attaching said driver component to said alignment means;

applying an adhesive to a surface of said driver component;

inserting said driver component through said driver opening of said fixture block using said alignment means; and contacting said adhesive on said surface of said driver component to said flow tube using said alignment means.

Preferably, said adhesive comprises a cyanoacrylate adhesive.

Preferably, said driver component comprises a magnet.

Preferably, the method further comprises allowing said adhesive to cure and removing said alignment means from said driver opening of said fixture block.

Preferably, the method further comprises controlling a relative humidity of an environment surrounding said flow meter to cure said adhesive.

Preferably, the method further comprises controlling a temperature of said flow tube and said driver component to cure said adhesive.

Preferably, the method further comprises etching said outer surface of said flow tube prior to applying said adhesive.

Preferably, the method further comprises cleaning said outer surface of said flow tube prior to applying said adhesive.

Preferably, the method further comprises cleaning said surface of said driver component prior to applying said adhesive.

Preferably, the method further comprises applying an accelerator to said adhesive to accelerate curing of said adhesive.

Another aspect of the invention is a method of using said fixture apparatus to affix a pick-off component of said at least one pick-off to said flow tube of said flow meter, the method comprising:

attaching said pick-off component to said alignment means;

applying an adhesive to a surface of said pick-off component;

inserting said pick-off component through said pick-off opening of said fixture block using said alignment means; and contacting said adhesive on said surface of said at least one pick-off component to said flow tube using said alignment means.

Preferably, said adhesive comprises a cyanoacrylate adhesive.

Preferably, said pick-off component comprises a magnet.

Preferably, the method further comprises allowing said adhesive to cure and removing said alignment means from said at least one pick-off opening of said fixture block.

Preferably, the method further comprises controlling a relative humidity of an environment surrounding said flow meter to cure said adhesive.

Preferably, the method further comprises controlling a temperature of said flow tube and said pick-off component to cure said adhesive.

Preferably, the method further comprises etching said outer surface of said flow tube prior to applying said adhesive.

Preferably, the method further comprises cleaning said outer surface of said flow tube prior to applying said adhesive.

Preferably, the method further comprises cleaning said surface of said pick-off component prior to applying said adhesive.

Preferably, the method further comprises applying an accelerator to said adhesive to accelerate curing of said adhesive.

Another aspect of the invention is a method of manufacturing flow tubes made from a fluoropolymer substance that are substantially straight, the method comprising:

extruding a flow tube from an extruding system wherein said flow tube has a temperature above room temperature;

cutting a section of said flow tube;

securing said section of said flow tube to hold the straight longitudinal shape of said section of said flow tube straight as said section cools down from said temperature; and packaging said section of said flow tube to maintain the longitudinal shape of said section of said flow tube.

Preferably, said flow tube is made of perfluoroalkoxyethlene (PFA).

Preferably, the method further comprises etching said section of said flow tube before packaging said section of said flow tube.

Preferably, the method further comprises storing said section of said flow tube to avoid exposing said section of said flow tube to light.

Preferably, the method further comprises storing said section of said flow tube at a constant temperature.

Another aspect of the invention is a method of testing an alignment of a driver and at least one pick-off on a flow tube of a flow meter comprised of a base, said flow tube made from a fluoropolymer substance, said driver for vibrating said flow tube, and said at least one pick-off for detecting movement of said vibrating flow tube, said driver and said at least one pick-off are affixed to said flow tube with an adhesive, the method comprising:

vibrating said flow tube at at least one frequency using said driver;

receiving pick-off signals from said at least one pick-off, said pick-off signals represent a vibrating frequency of said flow tube;

processing said pick-off signals and signals representing said at least one frequency to determine a frequency response; and indicating an unacceptable alignment of said driver and said at least one pick-off on said flow tube based on said frequency response.

Preferably, the method further comprises indicating an unacceptable axial alignment of said driver and said at least one pick-off if said frequency response includes a second bending mode.

Preferably, the method further comprises indicating an unacceptable lateral alignment of said driver and said at least one pick-off if said frequency response includes a first torsion mode.

DESCRIPTION OF THE DRAWINGS

These and other advantages and features of the present invention may be better understood in connection with a reading of the following detailed description thereof in connection with the drawings in FIGS. 1–15.

DETAILED DESCRIPTION

FIGS. 1–15 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Description of FIG. 1

Figure 1:
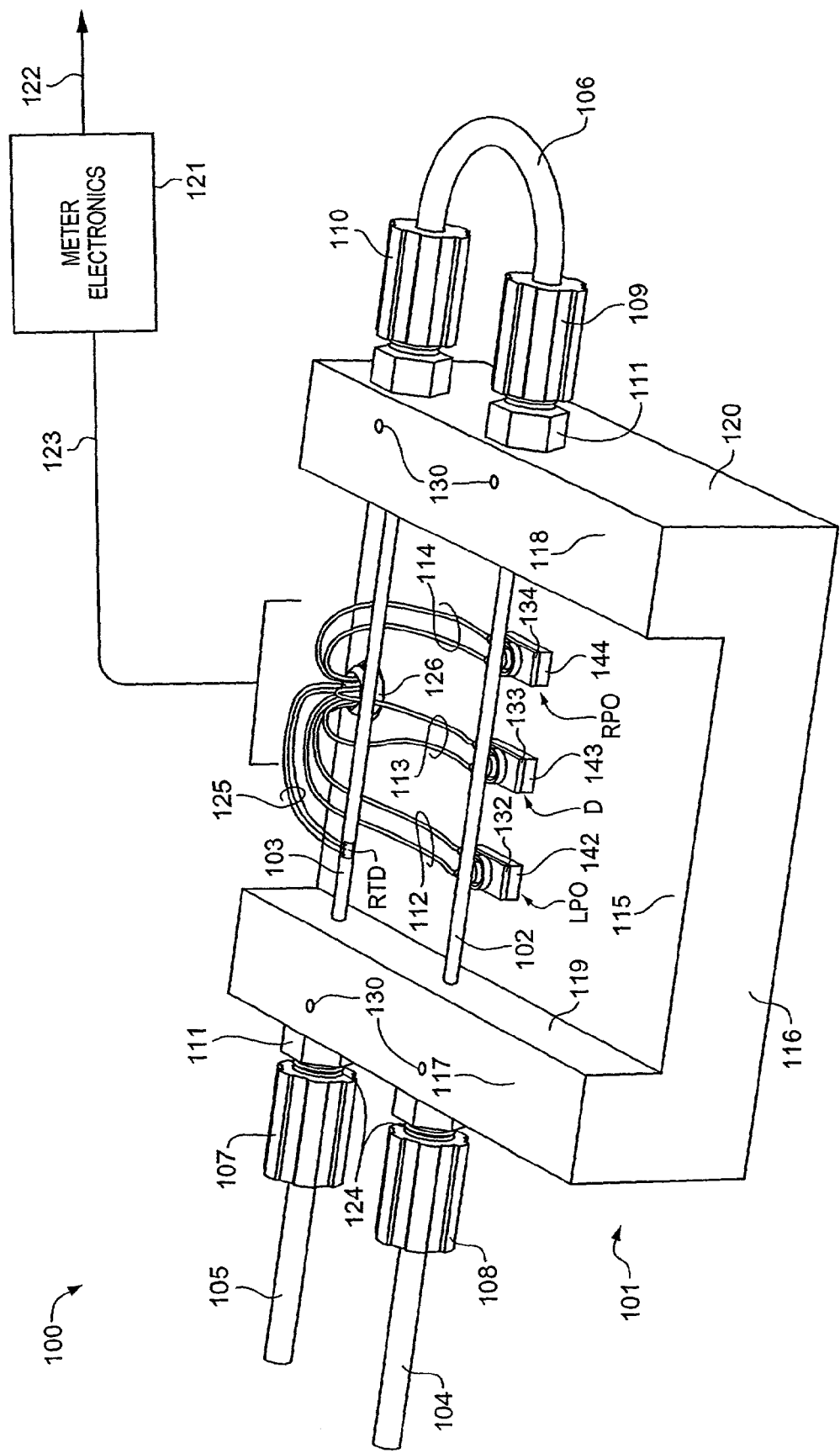
FIG. 1 discloses a perspective view of a flow meter in an example of the invention.

FIG. 1 is a perspective view of a first possible exemplary embodiment of the invention and discloses a flow meter 100 having a flow tube 102 inserted through legs 117, 118 of base 101. Pickoffs LP0 and RP0 and driver D are coupled to flow tube 102. Flow meter 100 receives a process material flow from supply tube 104 and extends the flow through connector 108 to flow tube 102. Driver D vibrates flow tube 102 at its resonant frequency with material flow. Pickoffs LP0 and RP0 detect the resulting Coriolis deflections and apply signals representing the Coriolis deflections over conductors 112 and 114 to meter electronics 121. Meter electronics 121 receives the pickoff signals, determines the phase difference between them and applies output information pertaining to the material flow over output path 122 to a utilization circuit not shown.

The material flow passes from flow tube 102 and through tube 106. Tube 106 redirects the material flow through return tube 103 through connector 107 to exit tube 105. Exit tube 105 delivers the material flow to a user application. This user application may be a semiconductor processing facility. The process material may be a semiconductor slurry which is applied to the surface of a semiconductor wafer to form a flat surface. The PFA material used in the flow tubes shown on FIG. 1 ensures that the process material is free of impurities such as ions which could be transferred from the walls of metals or glass flow tubes.

In use, flow tube 102 is of a narrow diameter approximating that of a soda straw and of negligible weight such as, for example, 0.8 grams excluding the weight of the magnets. The magnets associated with the pickoffs LPO and RPO and driver D have a mass of 0.2 grams each so that the combined mass of the flow tube 102, the affixed magnets and the process material is approximately 2 grams. Vibrating flow tube 102 is a dynamically unbalanced structure. Base 101 is massive and weighs approximately 12 pounds. This provides a ratio of the mass of the base to that of a material filled flow tube of approximately 3000:1. A base of this mass is sufficient to absorb vibrations generated by the dynamically unbalanced flow tube 102 with material flow.

Connectors 107, 108,109 and 110 connect tubes 104, 105 and 106 to the ends of flow tube 102 and return tube 103. These connectors are shown in detail in FIG. 4. The connectors have a fixed portion 111 that includes threads 124. The movable portion of connectors 107–110 are threaded onto male threads 124 to connect their respective tubes to the fixed body of the connector of which the fixed portion 111 is a part. These connectors function in a manner similar to the well known copper tubing flared connectors to connect tubes 104, 105 and 106 to ends of flow tube 102 and return tube 103. Details regarding the connectors are further shown in FIG. 4. Temperature sensor RTD detects the temperature of return tube 103 and transmits signals representing the detected temperature over path 125 to meter electronics 121.

Openings 130 pass from a surface on leg 117 through to flow tube 102 and from a surface on leg 118 through to flow tube 102. Openings 130 could provide a place to inject adhesive to affix flow tube 102 to legs 117–118. A set screw could screwed into openings 130 to hold flow tube 102 in place.

Figure 2:
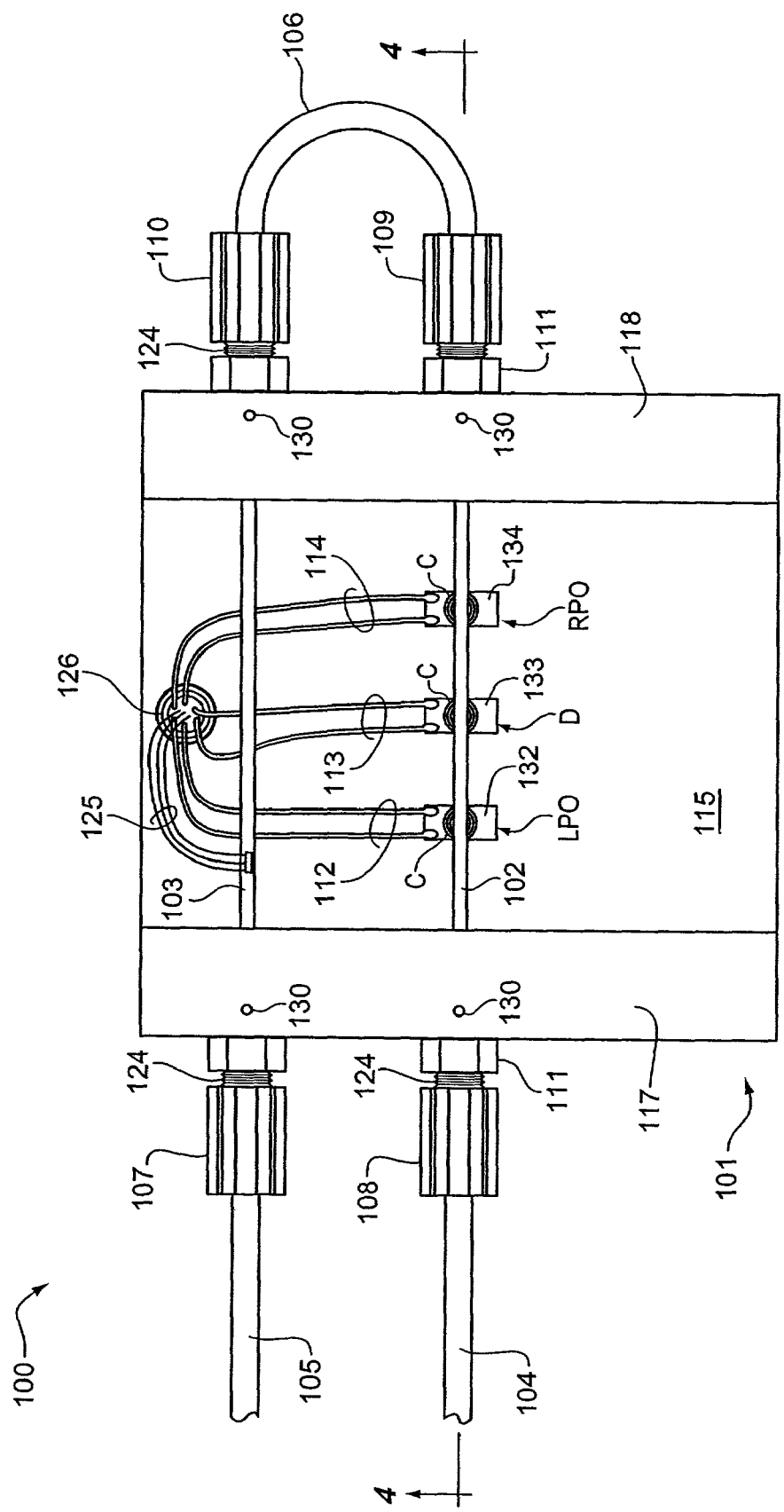
FIG. 2 is a top view of the flow meter of FIG. 1.

Description of FIG. 2

Figure 3:
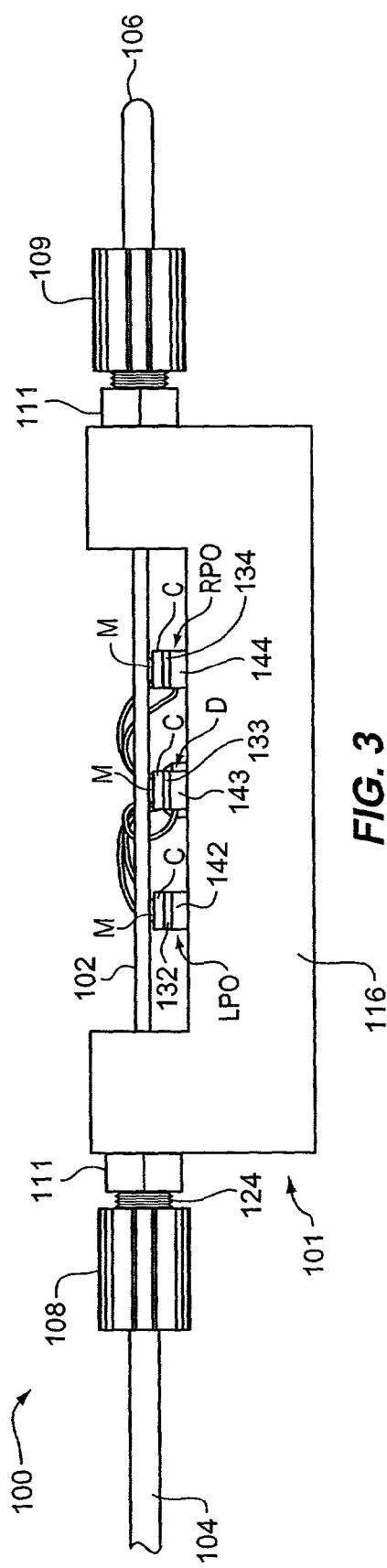
FIG. 3 is a front view of the flow meter of FIG. 1.

In FIG. 2 is a top view of flow meter 100 of FIG. 1. Pickoffs LP0 and RP0 and driver D each include a coil C. Each of these elements further includes a magnet that is affixed to the bottom portion of flow tube 102 as shown in FIG. 3. Each of these elements further includes a base, such as 143 for driver D, as well as a thin strip of material, such as 133 for driver D. The thin strip of material may comprise a printed wiring board to which coil C and its winding terminals are affixed. Pickoffs LP0 and RP0 also have a corresponding base element 142 and 144 and a thin strip 132 and 134 fixed to the top of the base element. This arrangement facilitates the mounting of a driver or a pickoff to be accomplished by the steps of gluing a magnet M to the underside of PFA flow tube, gluing the coil C to a printed wiring board 133 (for driver D), positioning the opening in coil C around the magnet M, moving the coil C upwardly so that the magnet M fully enters the opening in coil C, then positioning base element 143 underneath the printed wiring board 133 and bolting these elements together so that the bottom of base 143 is affixed to the surface of the massive base 116. A system and method for affixing the driver D and the pick-offs LPO and RPO to flow tube 102 is discussed in FIGS. 12–13 below.

The male threads 124 of connectors 107–110 are shown on FIG. 2. The inner details of each of these elements is shown on FIG. 4. Opening 126 receives conductors 112, 113 and 114. Meter electronics 121 of FIG. 1 is not shown on FIG. 2 to minimize drawing complexity. However it is to be understood that the conductors 112, 113 and 114 extend through opening 126 and further extend over path 123 of FIG. 1 to meter electronics 121 of FIG. 1.

Description of FIG. 3

FIG. 3 shows pickoffs LP0, RP0 and driver D as comprising a magnet M affixed to the bottom portion of flow tube 102 and a coil C affixed to the base of each of elements LP0, RP0 and driver D.

Figure 4:
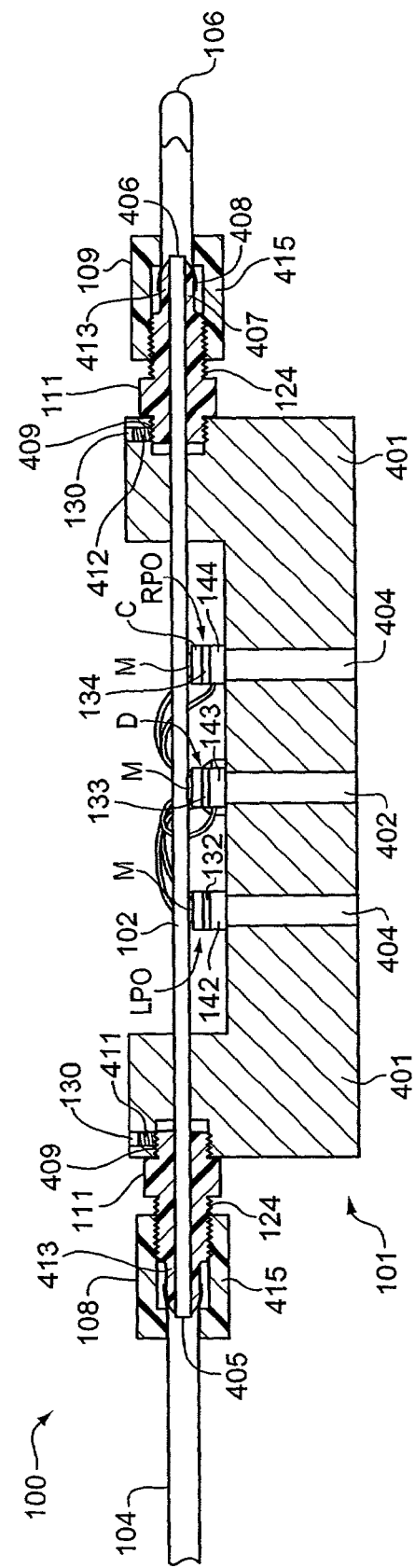
FIG. 4 is a cross-sectional view taken along lines 4—4 of the flow meter in FIG. 2.

Description of FIG. 4

FIG. 4 is a sectional view taken along line 4—4 of FIG. 2. FIG. 4 discloses all the elements of FIG. 3 and further details of connectors 108 and 109. FIG. 4 further discloses openings 402 and 404 in base 101. The top of each of these openings extends to the lower surface of the base of pickoffs LP0, RP0 and driver D. The coil C and magnet M associated with each of these elements is also shown on FIG. 4. Meter electronics 121 of FIG. 1 is not shown on FIGS. 3 and 4 to minimize drawing complexity. Element 405 in connector 108 is the inlet of flow tube 102; element 406 in connector 109 is the outlet of flow tube 102.

The fixed body 111 of connector 108 includes male threads 409 which screw into mating threads in element 401 of base 101 to attach connector 111 to element 401 of base 101. The fixed body 111 of connector 109 on the right is similarly equipped and attached by threads 409 to element 401 of base 101.

Fixed body 111 of connector 108 further includes a threaded portion 124 whose threads receive the movable portion 415 of connector 108. Connector 109 is similarly equipped. Fixed body 111 of connector 108 further includes on its left a conical stub 413 which together with movable element 415 acts as a flare fitting to force the right end of input tube 104 over the conical stub 413 of fixed body 111. This creates a compression fitting that sealably affixes the flared opening of supply tube 104 onto the conical stub portion 413 of fixed element 111. The inlet 405 of flow tube 102 is positioned in fixed body 111 and is flush with the outer surface of stub 413. By this means, the process material delivered by supply tube 104 is received by inlet 405 of flow tube 102. The process material flows to the right through flow tube 102 to fixed body 111 of connector 109 where the outlet 406 of flow tube 102 is flush with the end of stub 413. This sealably affixes the end 408 of tube 106 to connector 109 and to the outlet 406 of flow tube 102. The other connectors 107 and 110 of FIG. 1 are identical to those described for the details of connectors 108 and 109 on FIG. 4.

Figure 5:
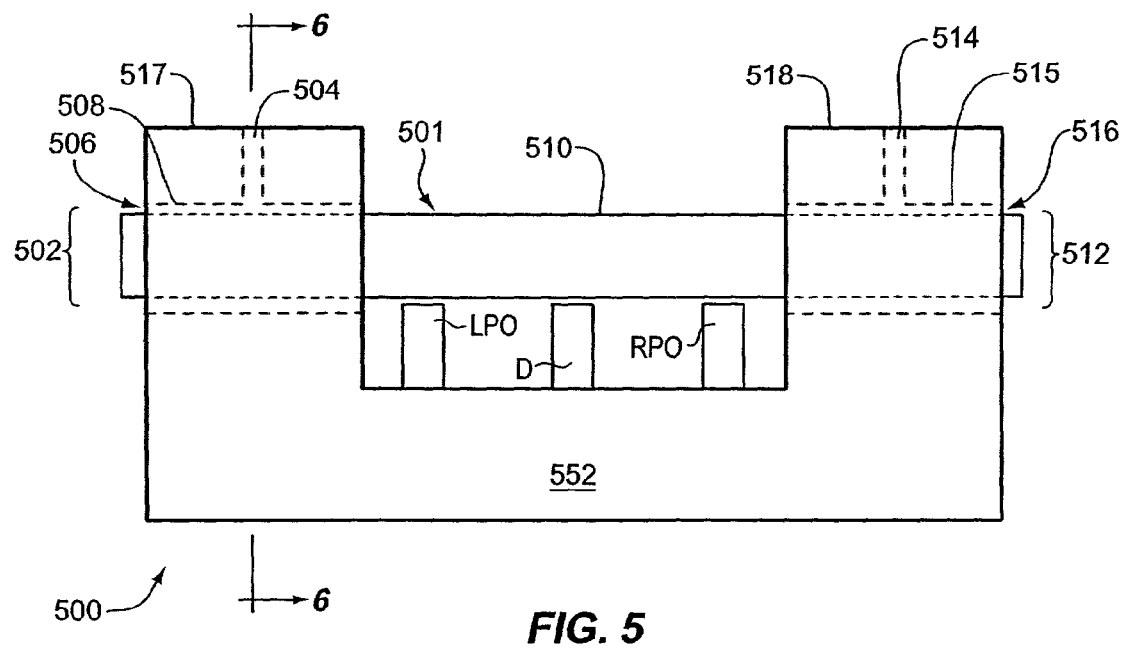
FIGS. 5–7 illustrate a flow meter having adhesive openings in a base of the flow meter in an example of the invention.
Figure 6:
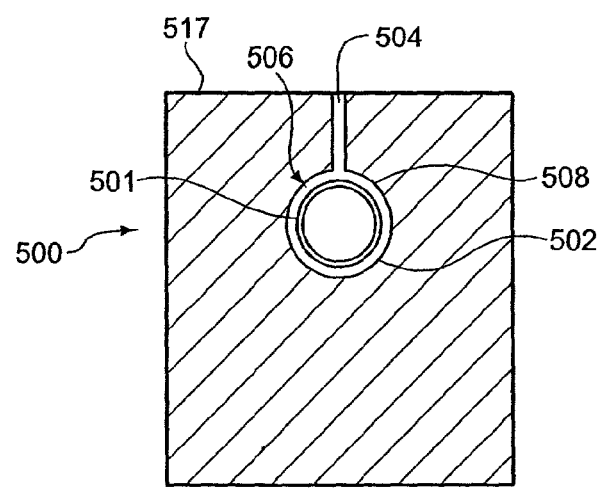
Figure 7:
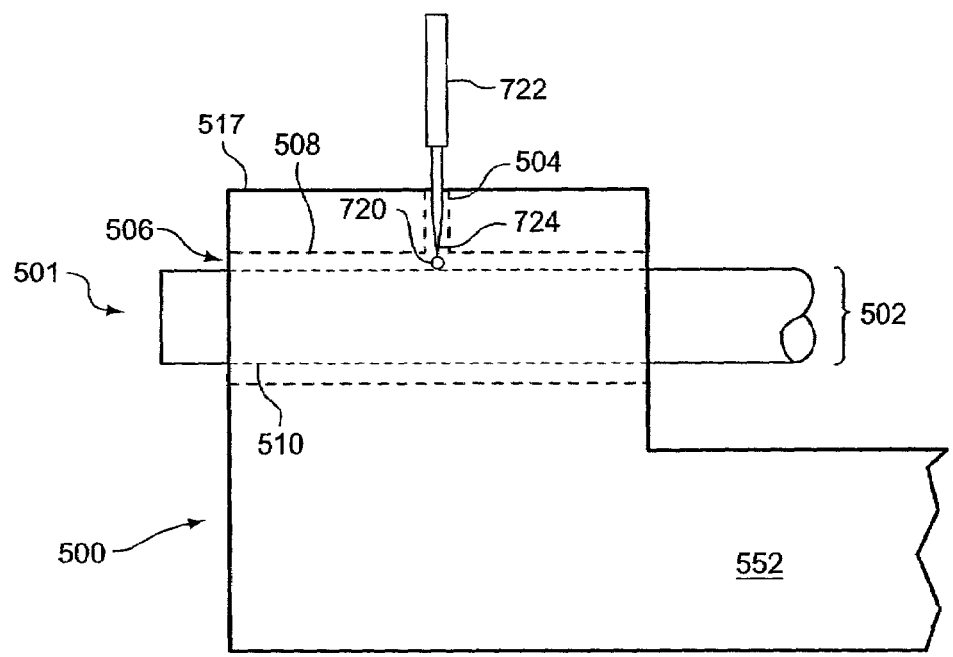

A Flow Meter with Adhesive Openings—FIGS. 5–7

FIGS. 5–7 illustrate an example of flow meter 500 in an example of the invention. Flow meter 500 is comprised of U-shaped base 552, flow tube 501, driver D, and pick-offs LPO and RPO as shown in FIG. 5. For the invention, flow meter 500 does not have to include U-shaped base 552. Flow meter 500 could include a V-shaped based or any other type of base, which are all within the scope of the invention. Flow tube 501 is made from a fluoropolymer substance. Examples of fluoropolymer substances are perfluoroalkoxyethylene (PFA), polytetrafluoroethylene (PTFE), and fluorinated ethylene polymer (FEP). U-shaped base 552 could be made of stainless steel. Driver D and pick-offs LPO and RPO are affixed to flow tube 501.

U-shaped base 552 of flow meter 500 is comprised of leg 517 and leg 518. Leg 517 and leg 518 are parallel to one another. Leg 517 includes tube opening 502 and adhesive opening 504. Adhesive opening 504 is shown as centered on leg 517, but adhesive opening 504 could be positioned closer to one side or the other. Tube opening 502 and adhesive opening 504 are positioned to intersect one another in leg 517. Leg 518 includes tube opening 512 and adhesive opening 514. Adhesive opening 514 is shown as centered on leg 518, but adhesive opening 504 could be positioned closer to one side or the other. Tube opening 512 and adhesive opening 514 are positioned to intersect one another in leg 518. Tube opening 502 and tube opening 512 are on the same axis.

Flow tube 501 passes through tube opening 502 and tube opening 512. Tube opening 502 has a diameter slightly larger than flow tube 501 to create a gap 506 between tube opening 502 and flow tube 501. FIG. 6 is a cross-sectional view of leg 517 that illustrates tube opening 502, adhesive opening 504, and gap 506. Adhesive opening 504 provides access to gap 506 so that adhesive may be applied to outer surface 510 of flow tube 501 and inner surface 508 of tube opening 502. Tube opening 512 of FIG. 5 has a diameter slightly larger than flow tube 501 to create a gap 516 between tube opening 512 and flow tube 501. Adhesive opening 514 provides access to gap 516 so that adhesive may be applied to outer surface 510 of flow tube 501 and inner surface 515 of tube opening 512. The adhesive bonds flow tube 501 to inner surface 508 of tube opening 502 and inner surface 515 of tube opening 512.

Flow meter 500 operates substantially the same as flow meter 100 described in FIGS. 1–4. Flow meter 500 receives a flow of process material. The process material travels through flow tube 501. Driver D vibrates flow tube 501 at a resonant frequency. Pick-offs LPO and RPO are also affixed to flow tube 501. Pick-offs LPO and RPO detect Coriolis deflections caused by the flow of process material in flow tube 501 and generate signals indicating the deflections. The signals are sent to meter electronics (not shown) that process the signals.

The following illustrates a method that a manufacturer may use to bond flow tube 501 to tube opening 502 and tube opening 512 in flow meter 500. First, the manufacturer orientates tube opening 502, adhesive opening 504, and flow tube 501 on a horizontal plane. Referring to FIG. 7, the manufacturer positions a tip 724 of an adhesive applicator 722 in adhesive opening 504 to access gap 506 proximate outer surface 510 of flow tube 501 and inner surface 508 of tube opening 502. Understand that adhesive applicator 722 is not vertical as it appears in FIG. 7. Adhesive opening 504, tube opening 502, and flow tube 501 are on a horizontal plane, and therefore, adhesive applicator 722 is inserted horizontally into adhesive opening 504. One example of adhesive applicator 722 is an EFD micro-dispenser model 1500 XL-CA. The micro dispenser is set to 3 psi and has a 3 ml syringe and a 0.006 inch Teflon-lined needle that is one-half inch long. The manufacturer introduces an amount of adhesive 720 in gap 506 between outer surface 510 of flow tube 501 and inner surface 508 of tube opening 502. Adhesive 720 could be an cyanoacrylate adhesive (CA). One example of CA is Superbonder 420 from Loctite.

Due to the surface energies of outer surface 510 and inner surface 508, adhesive 720 is drawn into gap 506 due to capillary action or wicking. The arrows in FIG. 7 illustrate the wicking action. The wicking action provides for nearly 100% coverage of gap 506. By positioning tube opening 502, adhesive opening 504, and flow tube 501 horizontally, adhesive 720 is not subjected to hydrostatic pressure. Therefore, adhesive 720 fills gap 506 due to wicking and is not affected by hydrostatic pressure. When adhesive 720 reaches the ends of tube opening 502, the wicking stops and forms a uniform and symmetric fillet. The manufacturer allows adhesive 720 to cure in gap 106.

The manufacturer then orientates tube opening 512, adhesive opening 514, and flow tube 501 on a horizontal plane. This may be the same horizontal plane as above so that tube opening 102 and tube opening 112 can be joined to flow tube 501 at the same time. The manufacturer positions tip 724 of adhesive applicator 722 in adhesive opening 514 to access gap 516 proximate outer surface 510 of flow tube 501 and an inner surface 515 of tube opening 512. The manufacturer introduces an amount of adhesive 720 in gap 516 between outer surface 510 of flow tube 501 and inner surface 515 of tube opening 512. Due to the surface energies of outer surface 510 and inner surface 515, adhesive 720 is drawn into gap 516 due to capillary action or wicking. By positioning tube opening 512, adhesive opening 514, and flow tube 501 horizontally, adhesive 720 is not subjected to hydrostatic pressure. Therefore, adhesive 720 fills gap 516 due to wicking and is not affected by hydrostatic pressure. When adhesive 720 reaches the ends of tube opening 512, the wicking stops to form a uniform and symmetric fillet. The manufacturer allows adhesive 720 to cure in gap 516. Set screws may be threaded into adhesive openings 504 and 514 after applying the adhesive to further hold flow tube 501 in place.

Adhesive openings 504 and 514 advantageously provide easy, convenient, and effective access to gaps 506 and 516 to adhere flow tube 501 to inner surfaces 508 and 515.

Bond Strength

The strength and quality of the bond between flow tube 501 and tube openings 502 and 512 depends on the type and amount of adhesive used, the preparation of the surfaces being bonded, the humidity of the air when the adhesive is curing, the temperature of the surfaces when the adhesive is curing, and the size of the gap between the surfaces being bonded.

Adhesive Selection

The manufacturer can choose a type of adhesive based on its viscosity. The viscosity of the adhesive affects how the adhesive wicks in gaps 506 and 516. A preferred viscosity range for adhesives is 2 to 110 centipoise. The amount of adhesive used depends on the strength needed for the bond, the speed of curing, and the ease of manufacturing.

Surface Preparation

To create a strong bond, outer surface 510 of flow tube 501, inner surface 508 of tube opening 502, and inner surface 515 of tube opening 512 should be properly prepared. Surfaces 510, 508, and 515 are prepared before adhesive is applied. As stated in the background, flow tube 501 that is made of a fluoropolymer substance, such as PFA, has a very low surface energy. This makes it very hard for an adhesive to bond to flow tube 501. The following method allows a manufacturer to create a stronger bond to outer surface 510 of flow tube 501. The manufacturer etches outer surface 510 of flow tube 501 prior to assembling flow meter 500. The manufacturer can etch outer surface 510 using a sodium naphthalene etchant. Examples of sodium naphthalene etchants are Ethylene Glycol Dimethyl Ether, Diethylene Glycol Dimethyl Ether, and Tetraethylene Glycol Dimethyl Ether. Those skilled in the art will appreciate that the supplier of flow tube 501 could etch outer surface 510 so that the manufacturer of flow meter 500 would not have to. The manufacturer then cleans outer surface 510. The manufacturer could use an alcohol solution to clean outer surface 510.

Inner surface 508 of tube opening 502 and inner surface 515 of tube opening 512 are also prepared. Assume for this example that U-shaped base 552 is made out of stainless steel. The manufacturer roughens tube openings 502 and 512. An optimized surface roughness could be about 64 microinch RMS. As is often the case, when the manufacturer machines tube openings 502 and 512 in U-shaped base 552, inner surfaces 508 and 515 have a surface roughness that is adequate for a strong bond. The manufacturer then cleans inner surfaces 508 and 515 to remove machining oils and other substances. The manufacturer could clean inner surfaces 508 and 515 by washing inner surfaces 508 and 515 with acetone in an ultrasonic bath. The manufacturer could also clean inner surfaces 508 and 515 with alcohol prior to applying an adhesive.

Humidity and Temperature

Humidity and temperature affect how an adhesive cures. To create a stronger bond, the manufacturer could control the environment in which flow meter 500 is being manufactured. Adhesives, such as CA, are moisture adhesives. Moisture is required on outer surface 510 of flow tube 501 and inner surfaces 508 and 515 of tube openings 502 and 512 for adhesive 720 to cure properly. Therefore, the manufacturer could control the relative humidity of the environment surrounding flow meter 500 while adhesive 720 is curing. The relative humidity could be kept between 40%–60% while adhesive 720 is curing. If the relative humidity is too low, an adhesive accelerator could be used to help cure adhesive 720. The manufacturer could also control the temperature of the environment surrounding flow meter 500 or control the temperature of the components flow meter 500 being bonded. The temperature could be set at about 23 degrees Celsius.

Size of Gap

The size of gaps 506 and 516 can be important to the strength of the bond. The size of gaps 506 and 516 is selected based on the viscosity of the adhesive being used, the ease of application, the quality of adhesive coverage, and the surface energies of outer surface 510 of flow tube 501 and inner surfaces 508 and 515 of tube openings 502 and 512. Gaps sizes that are acceptable range from 0.001 inches to 0.02 inches. If the gap is too small, the wicking of the adhesive is suppressed and there is insufficient adhesive coverage. If the gap is too large, the adhesive may not wick and may not fully cure. An optimal gap for gaps 506 and 516 would be around 0.0035 inches to create a strong bond.

A Fixture Apparatus—FIGS. 8–13

FIGS. 8–13 show a fixture apparatus 800 in an example of the invention. Fixture apparatus 800 is configured to secure a flow tube of a flow meter, such as flow meter 500, during manufacturing of the flow meter. Referring to FIG. 5, fixture apparatus 800 could be used to hold flow tube 501 in place so that flow tube 501 can be bonded to tube opening 502, tube opening 512, driver D, and pick-offs LPO and RPO.

Figure 8:
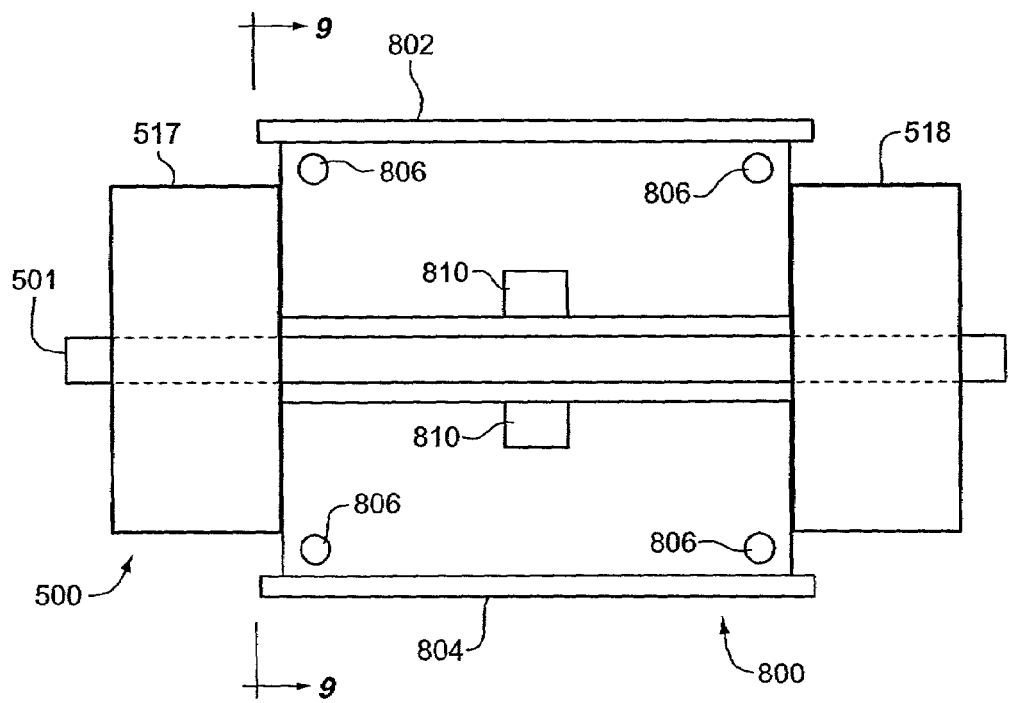
FIGS. 8–13 illustrate a fixture apparatus for manufacturing flow meters in an example of the invention.
Figure 9:
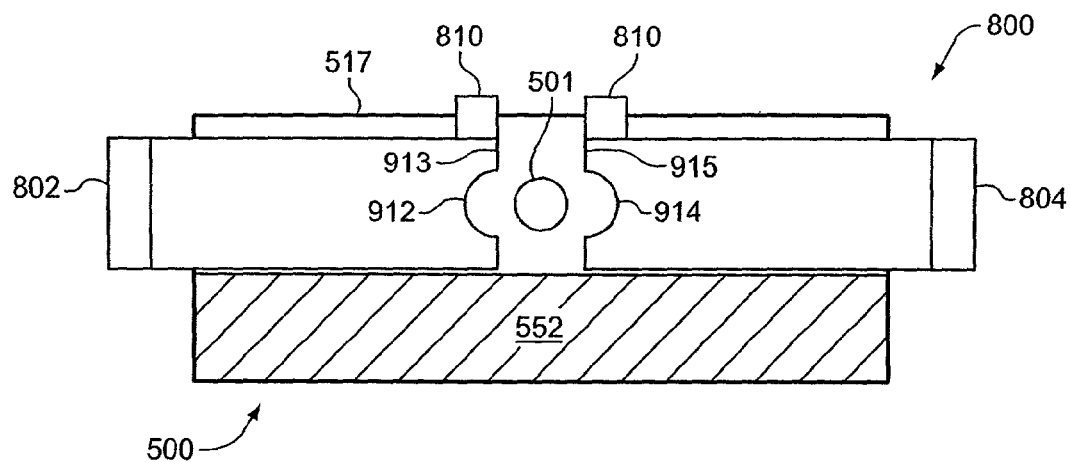

Fixture apparatus 800 is comprised of a first section 802 a second section 804 as shown in FIGS. 8–9. First section 802 and second section 804 could be made from Delrin or stainless steel. First section 802 includes a first tube opening portion 912 on an end 913 of first section 802. Second section 804 includes second tube opening portion 914 on an end 915 of second section 804. End 913 of first section 802 and end 915 of second section 804 are configured to fit adjacent one another.

Figure 10:
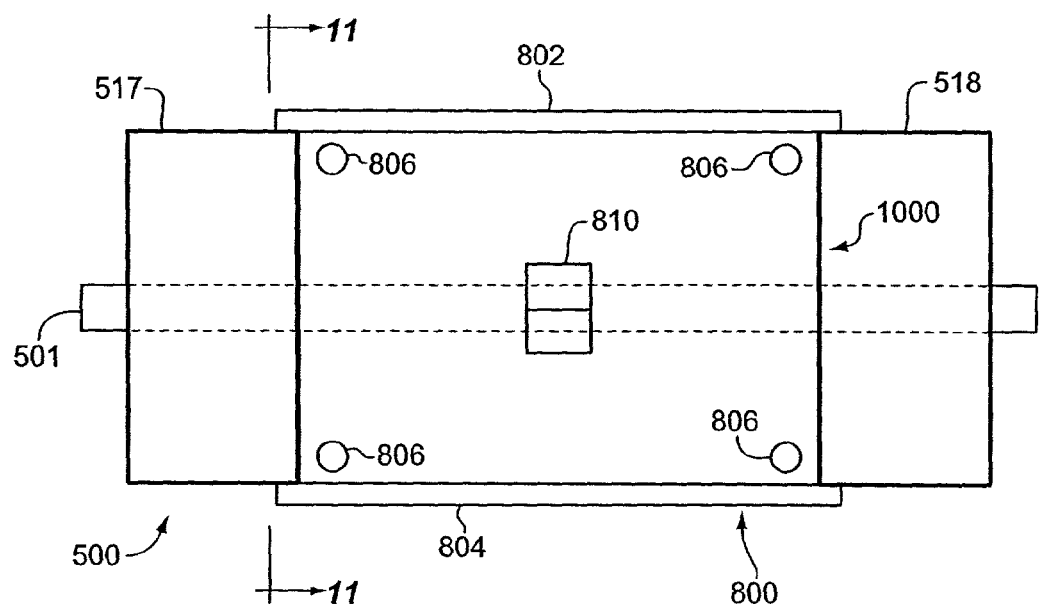
Figure 11:
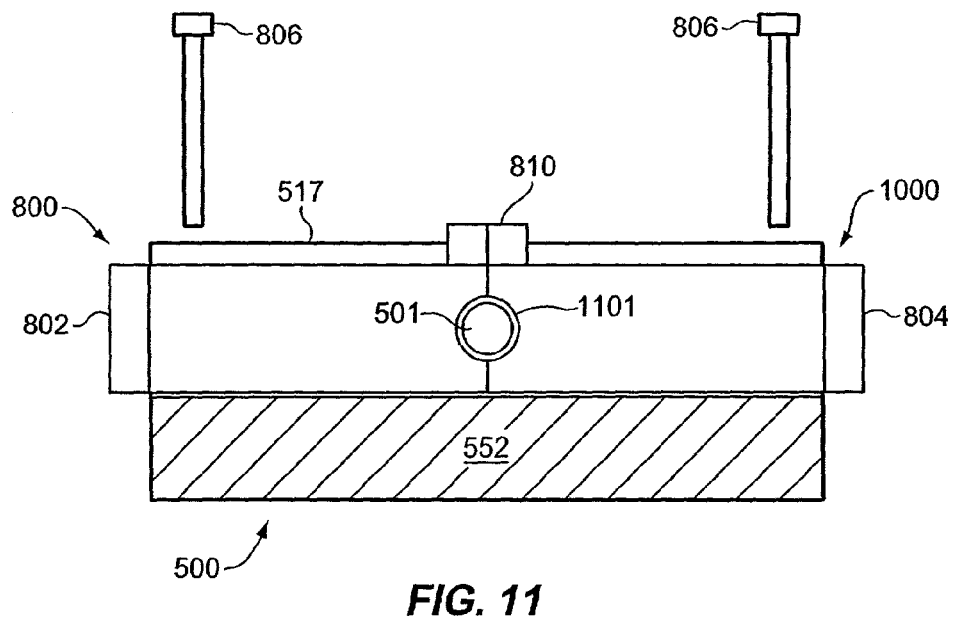

FIGS. 10–11 show first section 802 positioned adjacent second section 804. When placed adjacently, first section 802 and second section 804 form a fixture block 1000. Fixture block 1000 includes tube opening 1101 formed from first tube opening portion 912 and second tube opening portion 914 as shown in FIG. 9. Tube opening 1101 is for holding flow tube 501 of flow meter 500 during manufacturing. Tube opening 1101 is slighting larger than the diameter of flow tube 501. Fixture block 1000 is configured to fit between leg 517 and leg 518 of U-shaped base 552. Fixture block 1000 has a length that is substantially similar to a distance between an inner surface of leg 517 and an inner surface of leg 518.

Fixture apparatus 800 may also include securing means 806. Securing means 806 secures first section 802 and second section 804 to U-shaped base 552 of flow meter 500. Securing means 806 aligns tube opening 1101 with tube openings 502 and 512 of U-shaped base 552 in FIG. 5. Securing means 806 could be a bolt, screw, clamp, pin, or any other fastener.

Fixture apparatus 800 may also include fastening means 810 that attaches first section 802 to second section 804. Fastening means 810 could be a bolt, screw, clamp, pin, or any other fastener.

Fixture apparatus 800 performs the following functions. Fixture apparatus 800 forces flow tube 501 to be straight, taking any bow out of flow tube 501. Fixture apparatus 800 positions and holds flow tube 501 so that flow tube 501 is aligned with tube opening 502 and tube opening 512. Fixture apparatus 800 also positions and supports flow tube 501 so that driver components and pick-off components can be affixed to flow tube 501.

Figure 12:
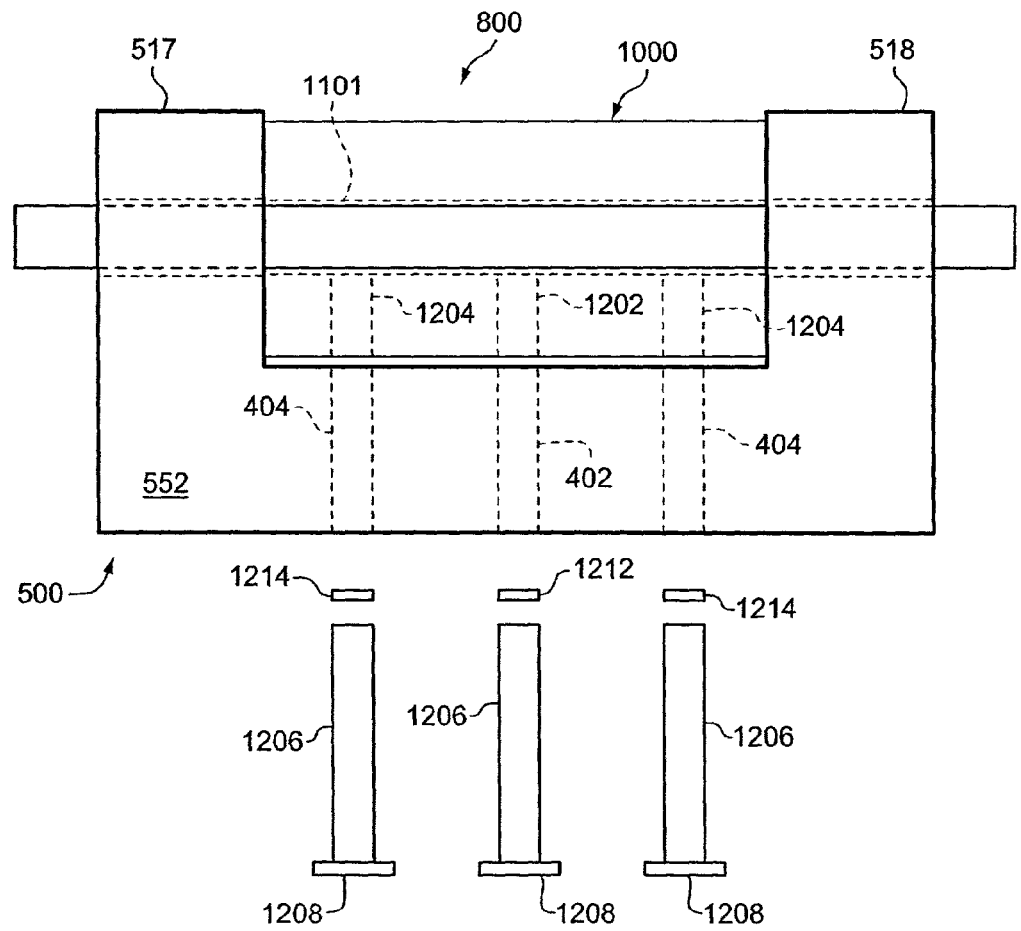
Figure 13:
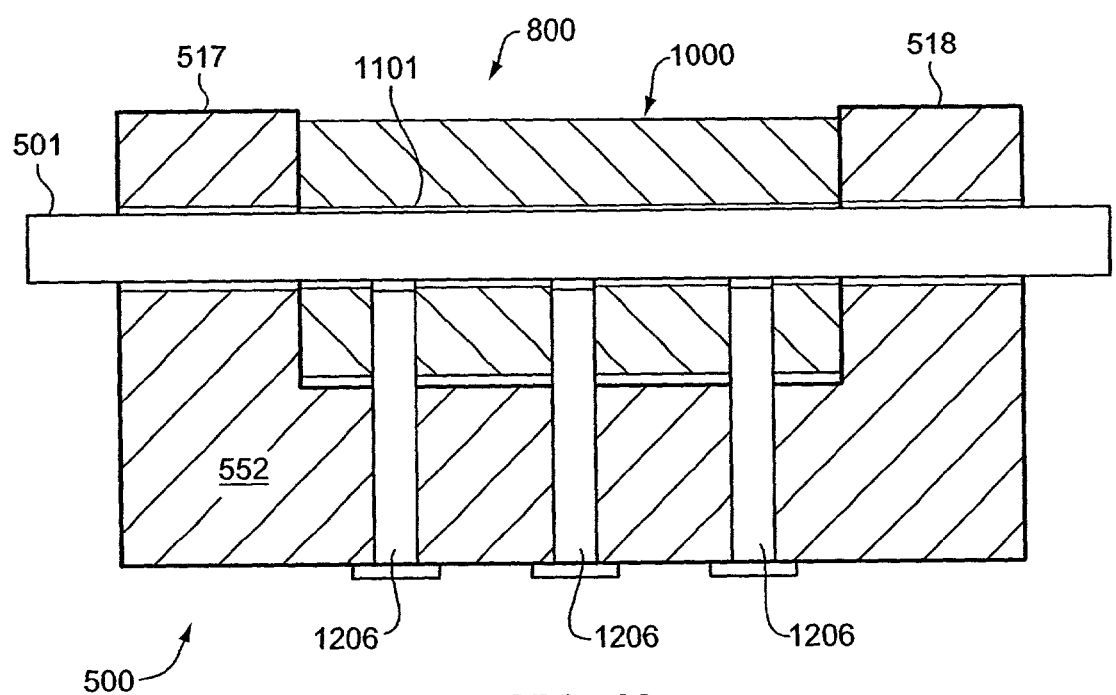

FIGS. 12–13 show another example of fixture apparatus 800 in an example of the invention. Fixture apparatus 800 includes a driver opening 1202. Driver opening 1202 extends from a surface of fixture block 1000 and intersects tube opening 1101 of fixture block 1000. In this example, U-shaped base 552 also includes opening 402. Driver opening 1202 is on the same axis as opening 402 of U-shaped base 552. Securing means 806 secures fixture block 1000 to U-shaped base 552 to align opening 402 of U-shaped base 552 with driver opening 1202 of fixture block 1000.

Fixture apparatus 800 also includes pick-off openings 1204. Pick-off openings 1204 extend from a surface of fixture block 1000 and intersect tube opening 1101 of fixture block 1000. In this example, U-shaped base 552 also includes openings 404. Pick-off openings 1204 are on the same axis as openings 404 of U-shaped base 552. Securing means 806 secures fixture block 1000 to U-shaped base 552 to align openings 404 of U-shaped base 552 with pick-off openings 1204 of fixture block 1000.

FIGS. 12–13 show driver opening 1202 and pick-off openings 1204 on a bottom side of fixture apparatus 800. Driver opening 1202 and pick-off openings 1204 align with openings 402 and 404 of U-shaped base 552. Driver opening 1202 and/or pick-off openings 1204 could be on a top side of fixture apparatus 800. In this case, U-shaped base 552 would not need to have openings 402 and 404.

Fixture apparatus 800 also includes alignment means 1206. Alignment means 1206 is configured to fit into opening 402 of U-shaped base 552 and into driver opening 1202 of fixture block 1000. Alignment means 1206 extends from a surface of fixture block 1000 to an area adjacent tube opening 1101 of fixture block 1000. Alignment means 1206 includes a lip 1208 on one end that is larger than a diameter of opening 402 or driver opening 1202. Lip 1208 allows alignment means 1206 to extend into opening 402 and driver opening 1202 a certain distance. Lip 1208 stops alignment means 1206 before the tip of alignment means 1206 comes into contact with flow tube 501. This prevents alignment means 1206 from damaging flow tube 501.

The following is an example of a method of using fixture apparatus 800 to hold flow tube 501 when bonding flow tube 501 to U-shaped base 552. A manufacturer inserts flow tube 501 through tube opening 502 of leg 517 and tube opening 515 of leg 518 in FIG. 5. The manufacturer aligns first half section 802 and second half section 804 on U-shaped base 552. The manufacturer abuts end 913 of first section 802 to end 915 of second section 804 to enclose flow tube 501 between first tube opening portion 912 and second tube opening portion 914 to form fixture block 1000. The manufacturer fastens first section 802 to second section 804. The manufacturer may secure fixture block 1000 to U-shaped base 552 using securing means 806. The manufacturer introduces an amount of adhesive in gap 506 between outer surface 510 of flow tube 501 and inner surface 508 of tube opening 502 of leg 517. The adhesive could be a CA. The manufacturer could introduce the adhesive through an adhesive opening, such as adhesive opening 504 as shown in FIGS. 5–7. The manufacturer also introduces an amount of adhesive in gap 516 between outer surface 510 of flow tube 501 and inner surface 515 of tube opening 514 of leg 518.

This method may incorporate the factors considered to produce a stronger bond as described above. In particular, the method could further include selecting the type and amount of adhesive used, preparing of the surfaces being bonded, controlling the humidity of the air when the adhesive is curing, controlling the temperature of the surfaces when the adhesive is curing, and selecting an optimal gap size.

The following is an example of a method of using fixture apparatus 800 to affix a driver component 1212 of driver D to flow tube 501. The manufacturer attaches driver component 1212 to alignment means 1206. Attaching in this sense does not mean that the driver component 1212 is necessarily secured to alignment means 1206. Driver component 1212 could just be set on an end of alignment means 1206. The manufacturer applies an adhesive to a surface of driver component 1212. The adhesive could be a CA. The manufacturer inserts driver component 1212 through opening 402 and driver opening 1202 using alignment means 1206. FIG. 13 shows alignment means 1206 fully inserted into opening 402 and driver opening 1202. The manufacturer contacts the adhesive on the surface of driver component 1212 to flow tube 501 using alignment means 1206. Lip 1208 prevents alignment means 1206 from pushing driver component 1212 too far and damaging flow tube 501. The manufacturer lets the adhesive cure. The manufacturer then removes alignment means 1206 from opening 402 and driver opening 1202.

This method may incorporate the factors considered to produce a stronger bond as described above. In particular, the method could further include selecting the type and amount of adhesive used, preparing of the surfaces being bonded, controlling the humidity of the air when the adhesive is curing, controlling the temperature of the surfaces when the adhesive is curing, and selecting an optimal gap size.

The following is an example of a method of using fixture apparatus 800 to affix a pick-off component 1214 of pick-offs LPO and RPO to flow tube 501. The manufacturer attaches pick-off component 1214 to alignment means 1206. Attaching in this sense does not mean that the pick-off component 1214 is necessarily secured to alignment means 1206. Pick-off component 1214 could just be set on an end of alignment means 1206. The manufacturer applies an adhesive to a surface of pick-off component 1214. The adhesive could be a CA. The manufacturer inserts pick-off component 1214 through opening 404 and pick-off opening 1204 using alignment means 1206. FIG. 13 shows alignment means 1206 fully inserted into opening 404 and pick-off opening 1204. The manufacturer contacts the adhesive on the surface of pick-off component 1214 to flow tube 501 using alignment means 1206. Lip 1208 prevents alignment means 1206 from pushing pick-off component 1214 too far and damaging flow tube 501. The manufacturer lets the adhesive cure. The manufacturer then removes alignment means 1206 from opening 404 and pick-off opening 1204.

Driver component 1212 and pick-off component 1214 could be magnets. Driver D and pick-offs LPO and RPO are commonly magnet-coil systems. Therefore, alignment means 1206 is made of a non-magnetic material, such as brass.

This method may incorporate the factors considered to produce a stronger bond as described above. In particular, the method could further include selecting the type and amount of adhesive used, preparing of the surfaces being bonded, controlling the humidity of the air when the adhesive is curing, controlling the temperature of the surfaces when the adhesive is curing, and selecting an optimal gap size.

Figure 14:
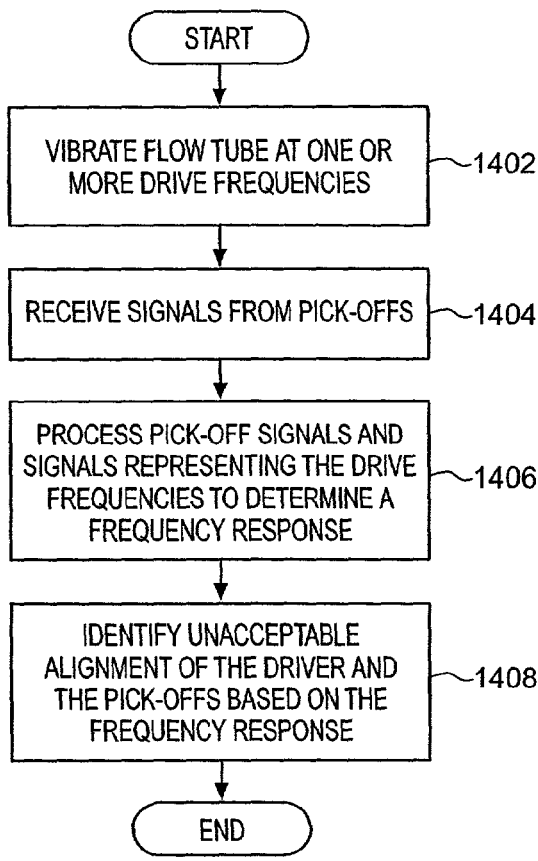
FIG. 14 illustrates a method of testing the alignment of a driver and pick-offs on a flow tube of a flow meter in an example of the invention.

Method of Testing Driver and Pick-off Alignment—FIG. 14

FIG. 14 illustrates a method for testing the alignment of a driver and pick-offs on a flow tube of a flow meter in an example of the invention. This method could be used to test how accurate a manufacturing process is in affixing driver components and pick-off components to a flow tube of a flow meter. For instance, after a flow meter manufacturer uses fixture apparatus 800 in FIGS. 8–13 to affix driver component 1212 and pick-off components 1214 to flow tube 501, the manufacturer could use this method to test the quality of fixture apparatus 800. Reference numbers for FIG. 14 are in parenthesis below.

To test a flow meter, the manufacturer vibrates the flow tube at one or more drive frequencies using the driver (1402). The manufacturer may vibrate the flow tube over a spectrum of frequencies to achieve more favorable results. The manufacturer uses a processing system to receive pick-off signals from the pick-offs (1404). The pick-off signals represent a vibrating frequency of the flow tube. The processing system processes the pick-off signals and signals representing the drive frequencies to determine a frequency response (1406). The processing system identifies unacceptable alignment of the driver and the pick-offs on the flow tube based on the frequency response (1408).

For instance, if the alignment of the driver and the pick-offs is good, then the frequency response includes only the first and third bending modes of the flow tube. If the frequency response includes a spike in a second bending mode of the flow tube, then this indicates a poor axial alignment of the driver and the pick-offs. The processing system would indicate to the manufacturer that the axial alignment is unacceptable. If the frequency response includes a spike in a first torsion mode of the flow tube, then this indicates a poor lateral alignment of the driver and the pick-off. The processing system would indicate to the manufacturer that the lateral alignment is unacceptable. The degree of misalignment of the flow tube, driver, or pick-offs is proportional to the leakage onto the second bending mode and the first torsional mode. Those skilled in the art will understand what the first, second, and third bending modes and the first torsion mode of the flow tube are. Therefore, an explanation will be left out for the sake of brevity.

Based on the information from the frequency response, the manufacturer can determine the quality of the flow tubes being built. The manufacturer can also use the information to change fixture apparatus 800 or some other component of the manufacturing process.

Figure 15:
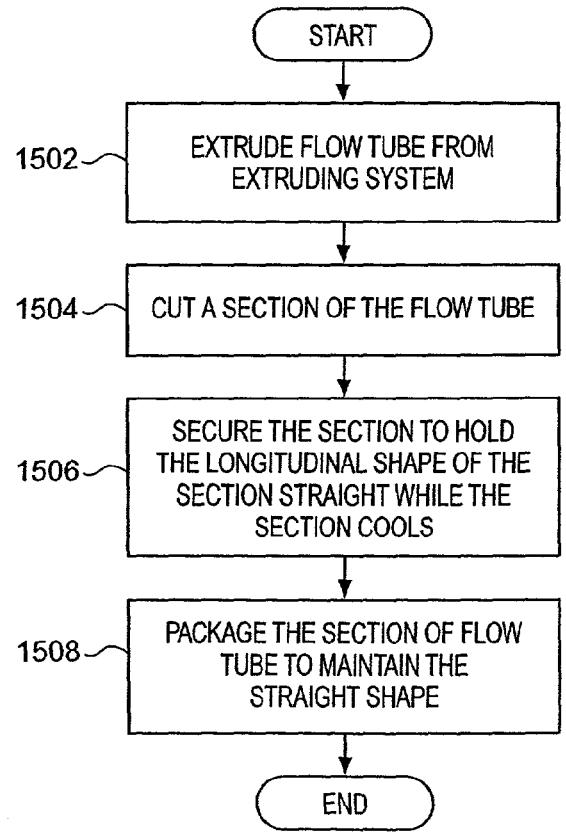
FIG. 15 illustrates a method for manufacturing flow tubes made from a fluoropolymer substance in an example of the invention.

Method of Manufacturing Flow Tubes—FIG. 15

FIG. 15 illustrates a method for manufacturing flow tubes made from a fluoropolymer substance in an example of the invention. As described in the background, flow tubes from flow tube manufacturers often have a curved shape. The flow tube manufacturers can use this method to produce straight flow tubes. Reference numbers for FIG. 15 are in parenthesis below.

The manufacturer extrudes a flow tube from an extruding system (1502). The flow tube is made from a fluoropolymer substance, such as PFA. The flow tube comes out of the extruder at a temperature that is higher than room temperature. The manufacturer cuts a section of the flow tube (1504). The manufacturer then secures the section of the flow tube to hold the longitudinal shape of the section straight as the section cools down (1506). For instance, the manufacturer could clamp the section to a flat surface to straighten the flow tube. The manufacturer could also put the flow tube in some type of mold to straighten the flow tube. When the flow tube has cooled and is straight, the manufacturer packages the section of flow tube to maintain the straight shape of the section (1508). The manufacturer could put the flow tube in some type of packaging mold to keep the flow tube straight during storage or shipping.

The manufacturer could also etch the section of said flow tube before packaging the section. This could be very convenient for the manufacturer of the flow meter. The manufacturer could store the section of flow tube in a special kind of packaging to avoid exposing the section of flow tube to light to avoid degrading the etched surface. The manufacturer could also store the section of flow tube in a controlled environment to keep the section at an ambient temperature. Both of these steps help to maintain integrity of the etched surface of the flow tube.

What is claimed is:

1. A method of assembling a Coriolis flow meter, comprising:
   providing a flow meter structure having a base and two legs, where the two legs are attached to the base and are in a spaced apart relationship, the two legs each having a cylindrical opening through the leg, where the two cylindrical openings are aligned in a co-axial relationship;
   providing a flexible fluoropolymer flow tube having an outer diameter, where the outer diameter is configured to fit into the two cylindrical openings in the two legs while leaving a predefined gap;
   placing the non-rigid flow tube into the two cylindrical openings where a section of the non-rigid flow tube extends between the two legs, and where the flow tube creates two predefined gaps between the outer diameter of the flow tube and the inner diameter of the two openings;
   inserting an adhesive in the two predefined gaps;
   holding the outer surface of the section of the flexible fluoropolymer flow tube extending between the two legs in an essentially straight configuration while the inserted adhesive cures.

2. The method of claim 1 where the adhesive is inserted into each predefined gap through an adhesive opening in each leg, where each adhesive opening intersects and is perpendicular to the cylindrical opening in each leg and where the axis of the two adhesive openings are in essentially the same plane and where the adhesive openings and the cylindrical openings are held in a horizontal orientation while the adhesive is inserted.

3. The method of claim 1 where the outer surface of the flow tube is etched in at least one of a plurality of attachment areas whereby an attachment area is an area where the flow tube is attached to another surface.

4. The method of claim 3 where the etching is done using a sodium naphthalene etchant.

5. The method of claim 1 where the section of the flow tube extending between the two legs is held in an essentially straight configuration by providing a fixture block where providing the fixture block comprises:
   inserting a first section between said first leg and said second leg of said base where the first section has a first tube opening portion on an end of the first section; and
   inserting a second section between said first leg and said second leg of said base where the second section has a second tube opening portion on an end of said second section, said end of said second section adapted to fit adjacent to said end of said first section to form a fixture block, said fixture block having a tube opening formed from said first tube opening portion and said second tube opening portion, and where the flow tube is held in the tube opening portion of said fixture block.

6. The method of claim 5 where providing the fixture block further comprises:
   providing a driver opening extending from a surface of said fixture block and intersecting said tube opening of said fixture block where a driver is attached to said flow tube using said driver opening; and
   providing at least one pick-off opening extending from said surface of said fixture block and intersecting said tube opening of said fixture block where at least one pick-off is attached to said flow tube using said at least one pick-off opening.

7. The method of claim 6 where the providing fixture block further comprises:

providing an alignment means adapted to fit in said openings of said fixture block and extend from said surface of said fixture block to an area adjacent said tube opening of said fixture block where the alignment means is used to hold the driver and the at least one pick-off in an aligned position with respect to the flow tube while being attached to the flow tube.

8. The method of claim 6 where providing the fixture block further comprises:

providing a securing means adapted to secure said first section and said second section to said base of said flow meter to align said driver opening of said fixture block with a driver opening in said base and to align said at least one pick-off opening of said fixture block with at least one pick-off opening in said base and using said securing means to secure said first section and said second section to said base.

9. The method of claim 1 where the flow tube is made of perfluoroalkoxyethlene (PFA).

10. The method of claim 1 where the flow tube is made of polytetrafluoroethylene (PTFE).

11. The method of claim 1 where the adhesive comprises a cyanoacrylate adhesive.

12. The method of claim 1 further comprising:

providing a plurality of components configured to attach to the section of the flow tube extending between the two legs;

aligning the plurality of components to a predefined set of locations along the flow tube;

attaching the plurality of components to the flow tube using the adhesive.

13. The method of claim 12 where at least one of the plurality of components is a driver.

14. The method of claim 12 where at least one of the plurality of components is a pickoff.

15. The method of claim 12 further comprising:

testing the position of the plurality of components by vibrating the flow tube using at least one of the plurality of components to drive the vibration and using at least one of the plurality of components to sense the vibration of the flow tube.

16. The method of claim 15 further comprising:

adjusting the predefined locations for the plurality of components based of the result of the tested positions.

17. The method of claim 1 further comprising:

manufacturing the provided flow tube by extruding a section of the flow tube wherein the extruded section of non-rigid flow tube has a temperature above room temperature;

securing the section of extruded flow tube to hold the longitudinal shape of the flow tube straight as the flow tube cools.

* * * * *

UNITED STATES PATENT AND TRADEMARK OFFICE
CERTIFICATE OF CORRECTION

PATENT NO. : 7,005,019 B2
APPLICATION NO. : 09/994264
DATED : February 28, 2006
INVENTOR(S) : Gary Edward Pawlas et al.

Page 1 of 1

It is certified that error appears in the above-identified patent and that said Letters Patent is hereby corrected as shown below:

Column 20, line 16, delete "non-rigid"; line 17, delete "non-rigid".

Column 22, line 22, delete "non-rigid".

Signed and Sealed this

Fourth Day of December, 2007

JON W. DUDAS
*Director of the United States Patent and Trademark Office*